United States Patent [19]

Sherman

[11] Patent Number: 5,054,961

[45] Date of Patent: Oct. 8, 1991

[54] ONSITE SOIL TREATMENT PROCESS

[75] Inventor: Lynn D. Sherman, Canton, Ohio

[73] Assignee: Ocean Todd Enterprises Inc., Perrysburg, Ohio

[21] Appl. No.: 551,906

[22] Filed: Jul. 12, 1990

[51] Int. Cl.$^5$ .......................... E02D 31/02; C02F 1/00
[52] U.S. Cl. ..................................... 405/128; 405/52; 405/258
[58] Field of Search ................. 405/52, 53, 54, 128, 405/129, 258, 267

[56] References Cited

U.S. PATENT DOCUMENTS

| | | | |
|---|---|---|---|
| 4,358,221 | 11/1982 | Wickberg | 405/128 |
| 4,401,569 | 8/1983 | Jhaveri et al. | 405/128 X |
| 4,543,016 | 9/1985 | Tallard | 405/267 |
| 4,664,560 | 5/1987 | Cortlever | 405/258 |
| 4,741,644 | 5/1988 | Cavalli et al. | 405/128 X |
| 4,765,775 | 8/1988 | Kroger | 405/52 |
| 4,863,312 | 9/1989 | Cavalli | 405/128 |

Primary Examiner—David H. Corbin
Attorney, Agent, or Firm—Michael Sand Co.

[57] ABSTRACT

The present invention relates to the method of 'in situ' collection and treatment of floating, sinking and dissolved contaminants in a soil environment which involves forming an in-ground diversionary water barrier as a boom around at least a portion of the waste site on the down-gradient side of the in-ground water flow, as a bottomless tank that through water removal creates an in-flow or in-gradient condition causing water to flow into and up in the tank area, or to control the downward flow and eventual discharge but control the detection time within the bottomless tank. The barrier involves forming an in-ground diversionary temporary water barrier as a boom around at least a portion of the waste site on the downstream side of in-ground water flow. The barrier preferably extends at least as deep as the in-ground contaminated water flow into the aquifer. The method utilizes collection and treatment members in the form of tubular pipes extending vertically or inclinedly adjacent the said barrier to form one or more collection reservoirs for the collection and treatment of contaminants in place or when removed to the surface such as by pumping. The method can be practiced over relatively short or long periods of time as long as the contaminants flow into the ground water. The said barrier maintains and controls both surface and in-ground water flow into and through the contaminated site to facilitate virtually complete removal and/or elimination of pollutants from the waste site area. The method may also be used to treat the contaminants in place in relatively deep reservoirs formed within the waste site or their removal to above-ground processing and elimination operations. The method permits anaerobic and aerobic treatment of the contaminants in-ground reservoirs or sumps where the contaminants are collected and treated, such as by bacterial growth, by most efficient and economical forms of treatment at and within the waste site.

18 Claims, 4 Drawing Sheets

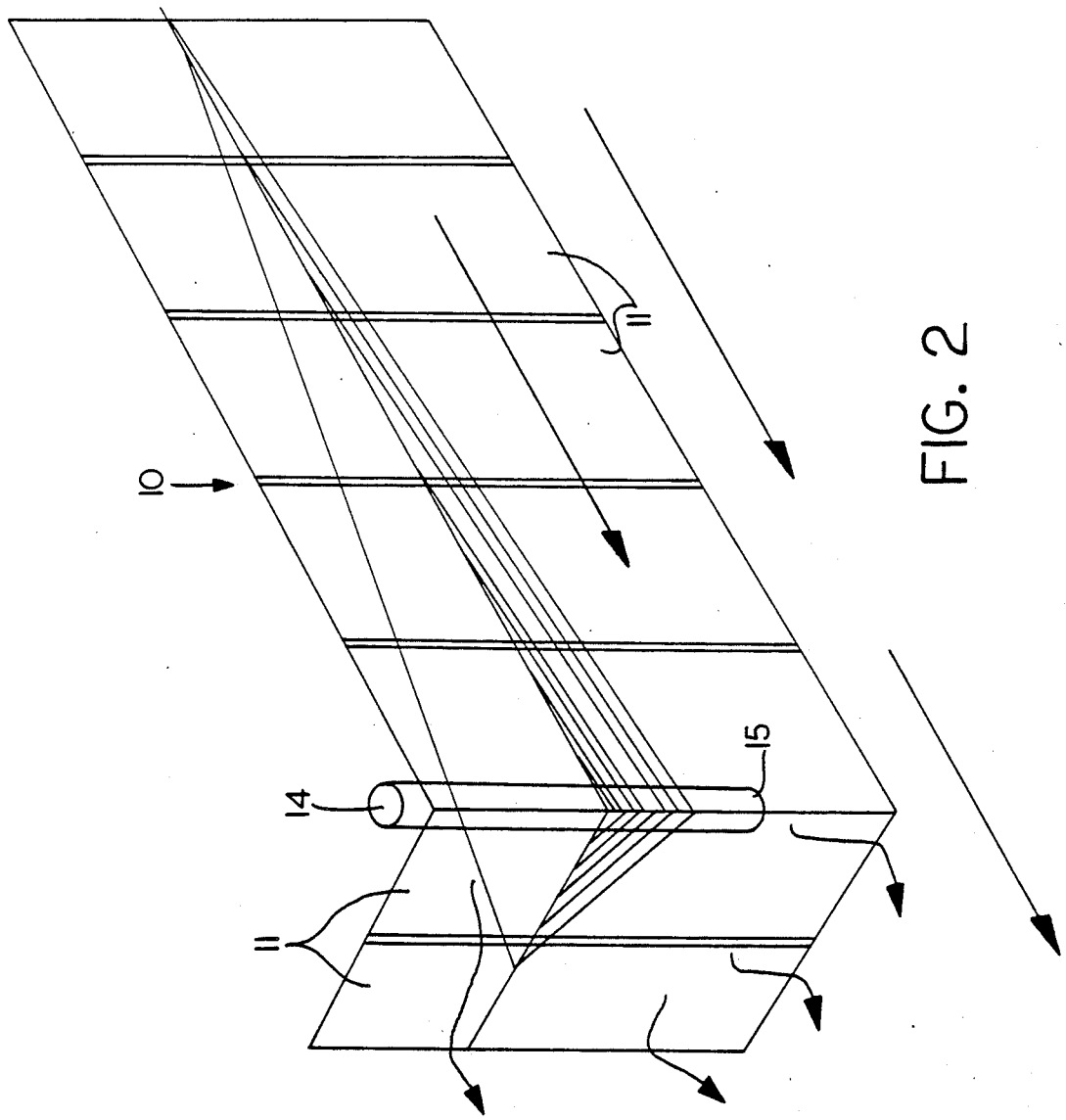

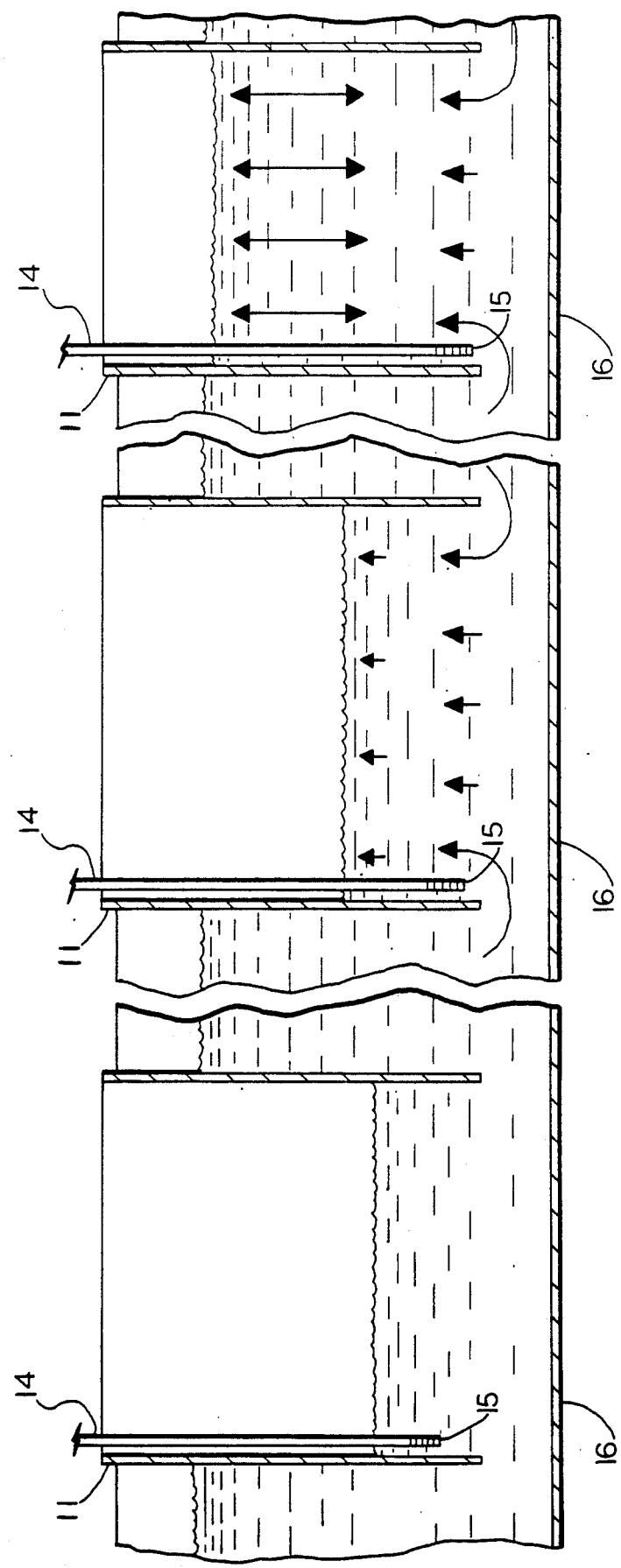

ONSITE SOIL TREATMENT PROCESS

BACKGROUND OF THE INVENTION

Contaminated water is generated by a wide variety of diverse processes which generally include rain from stormy weather contacting raw wastes or by ground water flowing through contaminated soil at uncontrolled waste sites. Normally, the occurrence of such polluted water requires treatment to render the pollutants harmless or to remove the pollutants prior to release of the water back into the environment. Previously, this has been accomplished by transporting the contaminated water offsite to a commercial treatment facility or treating onsite using mobile treatment apparatus. Onsite treatment provides several important advantages when compared with offsite treatment. Onsite cleanup of contaminated water eliminates the significant cost of waste water transportation. Treatment onsite can be initiated by direct and timely treatment of the contaminated water or by a mobile treatment plant. Direct control over treatment and disposal of waste water by-products is maintained when processing is handled onsite. The subject invention relates to onsite treatment of contaminated soil environments which expedite treatment of contaminants without costly soil removal or contaminated water transport from the site.

TECHNICAL FIELD

Recent technical developments in treatment of contaminated soils and the associated aquifers have shifted the emphasis of remedial actions from one of treating water to source reduction. It has been found that few ground water remedial actions have been successful without removal or significant reduction in the source of the contamination. It has been found in a recent study completed by the U.S. General Accounting Office that standard treatment of contaminated ground water including pumping from the site does not permanently meet the regulatory standards for cleanup of contaminated soil. Whenever the original static ground water level returns to normal, the ground water in most instances is found to be contaminated. The primary reason for this occurrence is that the great majority of the spilled or released chemical remains in the soils attached to individual soil particles. When water passes through such soil a portion of the chemical separates into the water and then enters the aquifer. Only when this source is removed will contamination of the aquifer be eliminated.

BACKGROUND INFORMATION

Mobile water treatment plants can be used on virtually any jobsite involving treatment of contaminated water. Such plants are capable of treating a wide variety of pollutants often found in water at uncontrolled waste sites. The mobile treatment plant may utilize a wide variety of chemical agents. Also air stripping columns capable of removing volatile compounds like methylene chloride, gasoline or benzene can be utilized in such systems. Such treatment plants can be employed on nearly any site where polluted waters present a significant problem. However, the contaminated water must be extracted from the soil such as by pumping and processed by the plant located above ground adjacent the job site.

Previously, watertight screens or panels have been employed in the ground to surround contaminated soil environments or waste dumps. One type of such apparatus has been disclosed in U.S. Pat. No. 4,664,560 issued May 12, 1987 which utilizes male and female interlocking plastic sections or profiles which are lengthy and sufficiently flexible to provide completely surrounding enclosures around waste sites to permit extraction of contaminated water. Such apparatus provides a subsurface watertight barrier surrounding the contaminated zone and is installed into a clay or similar geologic barrier that exists under the contaminated area to prevent migration of ground water to isolate material on one side of the barrier from release to the surrounding environment. Thus, such apparatus provides a subsurface watertight barrier to prevent migration of ground water to isolate material on one side of the barrier from material on the other side. Such barriers are costly to install and require virtually complete enclosure of the source of contaminated water and its removal to aboveground locations for treatment.

SUMMARY OF THE INVENTION

The present invention relates to the method of "in situ" collection and treatment of floating, sinking and dissolved contaminants in a soil environment which involves forming an in-ground diversionary water barrier as a boom around at least a portion of the waste site on the downgradient side of the in-ground water flow, as a bottomless tank that through water removal creates an in-flow or in-gradient condition causing water to flow into and up in the tank area, or to control the dbwnward flow and eventual discharge but control the detention time within the bottomless tank. The barrier involves forming an in-ground diversionary temporary water barrier as a boom around at least a portion of the waste site on the downstream side of in-ground water flow. The barrier preferably extends at least as deep as the in-ground contaminated water flow into the aquifer. The method utilizes collection and treatment members in the form of tubular pipes extending vertically or inclinedly adjacent the said barrier to form one or more collection reservoirs for the collection and treatment of contaminants in place or when removed to the surface such as by pumping. The method can be practiced over relatively short or long periods of time as long as the contaminants flow into the ground water. The said barrier maintains and controls both surface and in-ground water flow into and through the contaminated site to facilitate virtually complete removal and/or elimination of pollutants from the waste site area. The method may also be used to treat the contaminants in place in relatively deep reservoirs formed within the waste site or their removal to above-ground processing and elimination operations. The method permits anaerobic and aerobic treatment of the contaminants in in-ground reservoirs or sumps where the contaminants are collected and treated, such as by bacterial growth, by most efficient and economical forms of treatment at and within the waste site.

The subject method may be practiced without obstructing the free flow of ground water or surface water into or out of the containment area. The water barrier is employed to divert ground water flow to a collection sump and allow oil/water separation or other collection mechanisms to be employed. The barrier need not necessarily surround the entire contaminated soil/ground water area but acts as a diversionary wall or boom to intercept and control water flow. Ring-type organic compounds or other organic contaminants which require anaerobic degradation for one or more stages or degradation can be converted into environmentally safe non-toxic condition either in the subsurface collection sumps or be pumped to the surface for treatment. The process may also be employed to treat contaminated soil conditions beneath leaky tanks whether located above or below ground level for treating contaminants in the immediate area beneath such tank or tanks. The process is applicable to both short term and long term treatment of contaminated soil environments.

BRIEF DESCRIPTION OF THE DRAWINGS

Several preferred embodiments of the invention, illustrative of the best mode in which the applicant has contemplated applying principles, are set forth in the following description and shown in the drawings and are particularly and distinctly pointed out and set forth in the appended claims.

FIG. 2 is a schematic perspective view of the joined plastic sections in place forming an in-ground boom with collection and treatment tubular members located adjacently upstream;

FIG. 3 is a schematic view of the water barrier with adjacent collection and treatment tubular members in one processing embodiment;

FIG. 4 is a schematic view similar to FIG. 3 showing a second processing embodiment;

FIG. 5 is a schematic view similar to FIGS. 3 and 4 showing a third processing embodiment.

Similar numerals refer to similar parts throughout the drawings.

DESCRIPTION OF THE PREFERRED EMBODIMENTS

The present invention relates to a method of collecting floating, sinking or dissolved contaminants in soil environments employing a diversionary water barrier or boomlike structure not as a containment structure per se but as a water flow diversion and collection apparatus. The general principle involved is analogous to the boom collection and containment of spilled floating liquid material in open waterways. The water barrier utilizes some of the same principles of boom operation on open water but in the subject method operates as a diversionary water barrier mounted underground based on the characteristics of the waste site rate of ground water flow, mounding and soil particle turbulence which affect the total amount of floating contaminating product or products which can be collected by the system for treatment. In the case of slow moving ground water systems, the water barrier may be utilized as the containment device to collect and act as a reservoir for the contaminants, followed by suitable treatment.

As used in this disclosure, the term "contaminant" or "contamination" with regard to this invention refers to any constituent whether natural or man-made which could and does affect the free use of the soil, water or air. Removal of contaminants may be taken to mean soil removal, biodegradation, chemical alteration, vapor aerosol or gas extraction, or liquid removal or addition.

Figure 1:
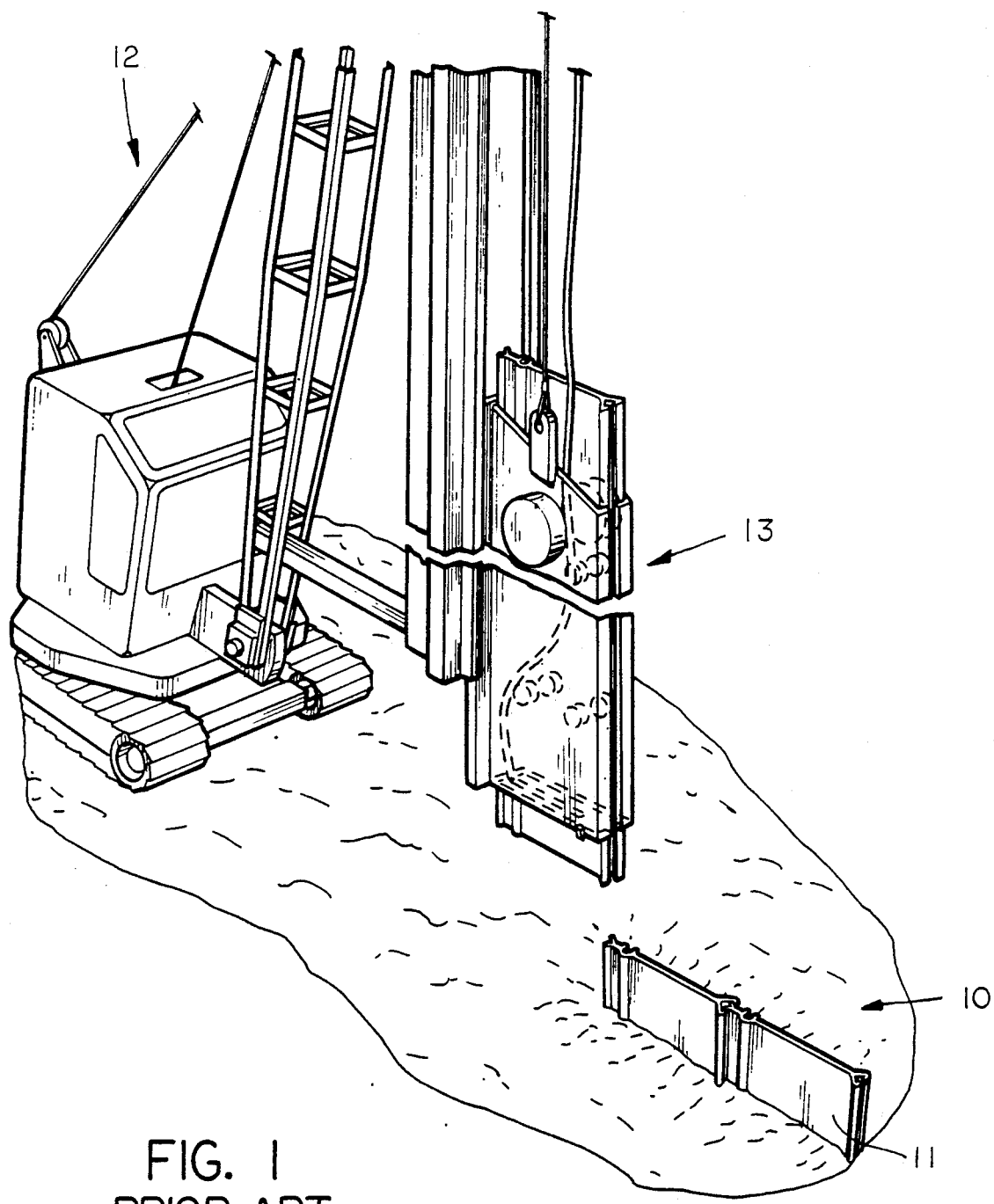
FIG. 1 is a perspective view of interlocked vertical plastic sections which are installed by a dragline, the joined sections being illustrative of an in-ground diversionary water barrier or boom.

As shown in FIG. 1 of the drawings, the diversionary water barrier 10 basically consists of interlocked panels 11 which may or may not be watertight, but which serve to direct and control in-ground water flow, the barrier extending in a direction transversely of the water flow. The lengthy plastic panels 11 are preferably installed vertically by a dragline 12 supporting a mandrel 13, the panels being joined by a tongue and groove configuration on their juxtaposed edge surfaces. The barrier is capable of inhibiting and controlling ground water movements in the areas of building pits, weirs, rubbish dumps, industrial sites, and the like which have been identified as sources of water contamination. It is preferred that the barrier 10 be erected around the downstream side of the contaminated soil environment, installed in the ground essentially vertically and at least to a depth wherein the contaminants affect ground water flow. It is desirable that the barrier be soil tight although it does not necessarily need to be watertight. The barrier is driven into the ground or installed by at least partial excavation transversely of the ground water movements. It is preferred that the barrier be constructed essentially watertight around at least the primary downstream flow pattern of the ground water to intercept the same for its direction into in-ground reservoirs or sump-like chambers.

The barrier is preferably thin walled having an essentially flexible cross-section with the barrier sections being interconnected such as by interlocking tongue and groove elements formed on the vertical edges of the sections. Such screens are disclosed in U.S. Pat. No. 4,664,560 which relates to forming a watertight enclosure around waste sites.

In the present invention, such interlocking sections need not be provided completely around the waste site but only on the downstream areas to control and collect contaminated or polluted water originating in the waste site. The water barrier structure may be employed as a complete enclosure or only a partial enclosure to divert and retain contaminated water flowing in-ground and into the localized water table and local aquifer. The direction of water flow toward the water barrier structure or so-called in-ground tank may be upflow or downflow depending upon geologic conditions at the waste site. Also by controlling the water level within the water barrier, it is possible to control soil moisture conditions which are capable of promoting biological growth. Saturated conditions can be induced to create anaerobic conditions and promote anaerobic degradation conditions as well as aerobic degradation conditions that will further degrade the contaminants to a final biological non-toxic endpoint.

Vertical tubular elements 14 such as tubular pipes are driven into the ground upstream of the water barrier and generally adjacent thereto. A plurality of such pipes may be installed vertically to a depth adjacent to and beneath primary in-ground water flow to form reservoirs or sumps 15 where oil/water contaminants can be collected and temporarily retained. The depth of the open-ended tubular pipes may be varied depending upon the waste site condition. One such tubular pipe 14 leading to a reservoir 15 at its lower open end is shown in FIG. 2. The pipes are normally installed in relatively close vertical parallel series, the water flow being shown by the arrows in FIG. 2. The closely-spaced parallel lines in the center area of FIG. 2 represent the oil/water collection of contaminants which may be treated in place or pumped to the surface for treatment. The barrier is used for in-soil collection of free product.

Some of the pipes may extend deeper than others for injection of chemicals and some of lesser depth are used to treat and/or remove the contaminants for on-surface treatment. In the case of organic chemical compounds having a lesser specific gravity than water, the oil/water mixtures are collected in the lower regions of the tubular pipes to permit either 'in situ' treatment of the contaminants or extraction of the same through the tubular pipes for above-ground processing and treatment. By utilizing the vertical pipes, 'in situ' soil washing may be employed using chemicals which will mobilize and remove heavy metals, inorganics or organics. Also, hot water or steam may be injected into the collection pipes to increase the flow of contaminants into the collection reservoirs. These mobilized constituents can be collected using collection wells or permeable zones upstream of the water barrier at any desired level depending upon the localized water table.

The barrier or boom is used to collect the solvent/solute mixture from the collection areas to thereby accelerate the clean-up activity. It is possible to add the hydrophilic or matched solubility solvent or solvents to the spill or contaminant source area. The barrier permits raising and lowering the water level upstream of the barrier to perform soil washing and/or reverse leaching operations. Water levels are adjusted by allowing the natural water gradient to pass under the barrier and travel up inside the soil tank or barrier until static conditions are established. Optimum conditions for 'in situ' soil washing or pump and treat technology can be varied based upon the waste site condition.

FIGS. 3, 4 and 5 show in a progressive series how the barrier may be used to handle the treatment of pollutants either in a single operation or by varying the treatment process in different embodiments. The normal water table for the waste site is shown exteriorly of the barrier for treating the pollutants within the barrier. The inner water level may be sequentially raised and lowered to gather pollutants from in and around the waste site for in-soil treatment such as by soil washing, or alternately, pump and treat procedures may be used. The upward arrows in FIG. 4 and the downward arrows in FIG. 5 show varied directions of water movement for treatment. The lower bottom lines 16 indicate a more or less water-impenetrable layer of clay or stone by which the water may only be slowly penetrated or be diverted.

The removal operation can be performed continuously or sequentially by washing selected areas of the contaminated soil environment with a series of mobilizing solutions introduced through the vertical or inclined pipes. This allows for the planned and specific controlled treatment of solids and liquids without physically removing the soil to a treatment unit for washing. Large quantities of soil can be treated at the same time by present-day regulatory procedures employing 'in situ' systems which are not presently in existence. Where the soil is not excavated as in the present processes, treatment standards do not apply and treatment can continue for long periods of time until acceptable and alternate treatment standards are met.

As stated, tubular members 14 are installed essentially vertically adjacent to the water barrier on the upstream side in the form of a series of vertical pipes which are utilized to either treat the contaminants in place within collection reservoirs in rather deep pockets within the contaminated soil or, alternately, the contaminated water may be removed from such collection sites through the pipes by pumping for above-ground treatment and neutralization of the contaminants into environmentally safe non-toxic products. The collection pipes may be installed essentially vertically or inclinedly such as beneath either above-ground or in-ground tanks which have been utilized to store various liquid materials such as gasoline, crude oil and petrochemicals, and which tanks may have leaked into the soil environment.

Figure 6:
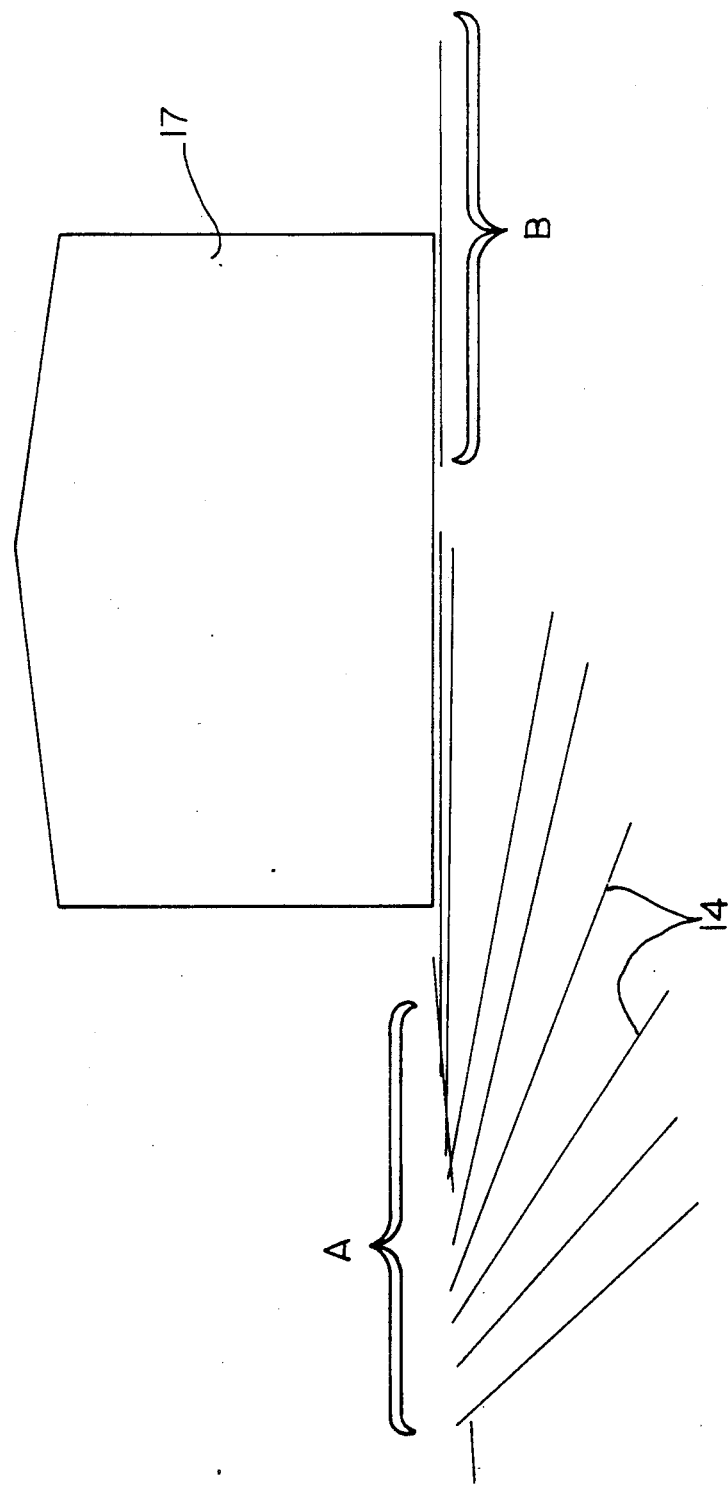
FIG. 6 is a schematic view similar to FIGS. 3, 4 and 5 showing a fourth processing embodiment under an above-ground tank.

Such treatment procedures are shown schematically in FIG. 6 wherein the pipes 14 (designated by the straight lines) are installed inclinedly into the area beneath the tank 16. The contaminants which have emitted from the tank over time can be treated 'in situ' without removal of the tank or adjacent structures. The downstream side of in-ground water flow on the left side has the pipes installed for treatment while the upstream side on the right side may or may not have pipes installed. The letter A designates the plurality of pipes 14 on the downstream side of the tank 17, and the letter B designates the upstream side into which pipes may or may not be installed depending upon the extent of tank leakage.

The collection pipes serve to collect both in-ground and above-ground water flow at low level points which upon testing indicate natural collection points due to the typography of the site. Tests which indicate flow of the contaminants into the aquifer also serve to indicate the preferred locations for the collection reservoirs. The collection pipes may serve to permit leaching and water washing of the soil upstream of the collection reservoirs for more timely removal of the contaminants increasing their flow into the reservoirs.

The collection pipes may also be used to inject reactants to support biological growth within the reservoirs for in place treatment of the contaminants and pollutants without soil removal. Downstream testing of the in-ground water flow over a period of time indicates the effectiveness of the in-ground treatment and directs the treatment program. The promotion of saturated moisture conditions within the reservoirs in addition to supplying bacteria, air and nutrients promotes biological growth whereby organic chemical contaminants can be converted by anaerobic degradation into environmentally safe and non-toxic by-products. Promotion of such biological growth can also proceed from anaerobic to aerobic back to anaerobic conditions to facilitate so-called "ring knicking" wherein particularly undesirable organic pollutants can be converted to essentially non-toxic condition by 'in situ' treatment. Ring-type organic compounds or other organic contaminants which require anaerobic degradation for one or more stages of degradation can be treated to form non-toxic compounds which are environmentally safe.

The below-ground treatment and removal of the in-ground contaminated water may be continued for varying periods of time depending upon the selected treatment and concentrations of pollutants which exist in the prescribed waste site environment.

Soil Washing Chemicals

Anionic, Cationic, and non-ionic surfactants which are emulsion forming compounds that break the surface tension between non-polar organic compounds and polar water molecules may be used.

Chelating Agents—ethylene diamine tetraacetic (EDTA), cyclohexylene diamine tetraacetic (CDTA), and other similar agents are added to bind and free the movement of particular metals ions in a solution for later extraction and removal. EDTA works best with divalent (2 charges) ions such as copper and CDTA works best with trivalent (3 charges) ions such as aluminum, ferric iron, etc.

Steam and Hot Water—this will act to mobilize those chemicals that are not in liquid form at the ambient soil temperatures. This same procedure is now being used in the oil fields of Texas to increase production from oil fields which have reduced production.

Acid Washing—dilute acid solutions of hydrochloric, phosphoric, nitric, acetic, and sulfuric acids to name a few can be used to mobilize metal movement in the soils for recovery, or can b used to break emulsions in-situ and allow collection of free floating product.

Chemicals that React in-situ

Ferrous sulfate is used to combine and make non-reactive free cyanide ions in solutions. Hydrogen peroxide, in the presence of a copper catalyst will oxidize phenol to carbon dioxide and water. Sodium hypochlorite in a basic solution will oxidize the cyanide ion to carbon dioxide and nitrogen gas.

Standard Biological Conditions for Aerobic Degradation

Oxygen requirements in activated sludge require a minimum of 1.0 mg/liter dissolved oxygen with a recommended range of 2.0 mg/liter. Any excess oxygen does not necessarily speed the process.

The recommended nutrient conditions for bacterial growth are a carbon to nitrogen ratio of 10:1 in the cells and a metabolic ration of 16.7 carbon atoms metabolized to 1 nitrogen atom or 16.7:1 C:N ratio. The nitrogen:-phosphorus ratio is in the 5:1 to 11:1 range and can be higher to exclude toxic effects of some metals such as lead.

Naturally-occurring soil bacteria may be enhanced to speed degradation of specially formulated bacterial mixes and can be used to attack specific problem chemicals in the soil. These specially-formulated bacteria may require continuous or frequent re-inoculation to keep an adequate number of organisms present in the soil to perform the necessary biodegradation.

Pseudomonas has been identified as effectively degrading phenols, benzene, toluene, ethyl benzene, fluorobenzene, chlorotoluene, naphthalene, and creosols. Norcadia has been identified as effectively degrading aliphatic acids, kerosene, jet fuel, paraffin wax, and detergents. Bacillus has been identified as effectively degrading hydrocarbons, oils and greases, pesticides, polymerized olefinic hydrocarbons, and latex.

The foregoing is a sampling of the literature on microbial degradation reactants and does not represent an exhaustive search or survey of all of the possible organisms or compounds that have demonstrated bio-degradation potential.

Examples of promoting anaerobic and aerobic bacterial growth and conversion to non-toxic by-products?

As depth increases, the oxygen content of the soil is severely reduced. Aerating the soil with wick drains will temporarily change this condition and allow aerobic treatment. If it is determined that anaerobic degradation is required, the soil aeration can be discontinued and as the available oxygen is utilized, anaerobic conditions will recur. To speed this process the soil can be saturated with water and a vacuum may be applied to degas the soils. Specially produced facultative anaerobic bacteria may be supplemented in the bacterial cultures applied to increase the available population of naturally-occurring facultative anaerobic organisms.

Generic classes of chemicals or reactants which are used to treat most common contaminants.

The majority of installations will use a bacterial culture prepared by supply houses for the chemicals of interest. The chemicals used will be fertilized (phosphorus, nitrogen (ammonia) and trace metals) to promote cell growth. And the last ingredient will be the application of oxygen through either a solution of hydrogen peroxide or compressed air, for example.

The regulations under the Superfund Amendments and Reauthorization Act, and the Resource Conservation and Recovery Act, require that all under-ground storage tanks be upgraded or removed based on a specific schedule. As such tanks have been removed, there has been a substantial increase in the total number of sites where extensive contamination of the under-lying soils has occurred. In many cases, the tank area has been excavated to a maximum depth possible by excavation equipment and in many cases building foundations or adjacent structural stability have required that excavation be halted to avoid endangering such structures.

For those leaking tanks which have not affected ground water and which have physical constraints for further excavation, until the advent of this invention there have been no remedial solutions for 'in situ' treatment of waste sites. The subject wick drain offers an 'in situ' means for bio-remediating these situations. The ease of installation in even the tightest locations or under existing structures makes the subject water barrier and methods of use the most versatile of remedial technologies presently existing.

As stated supra, the basic method involves treating the contaminants in a soil environment by either injecting the chemical and/or bacterial reagents into the waste site to the optimum depths for bio-remediation or chemical remediation of the contaminants and either treating the contaminants in place under-ground or pumping the same from collection points or wells for above-ground treatment. Obviously, the 'in situ' treatment is most expeditious and efficient depending upon the particular nature of the contaminants. Soil washing chemicals may be injected to effect soil washing and leaching action as well as introducing selected bacteria, nutrients and air to effect biological growth for degradation of the contaminants and their conversion into non-toxic environmentally-safe condition.

The method may also employ a plurality of porous pipes or tubes arranged in series or parallel to inject or pump water saturated with gas and containing gas bubbles such as oxygen, carbon dioxide, and other suitable gases selected for their remedial properties. By passing such gases down the tubing and discharging it continuously or intermittently, such as through porous pipes having uniform porosity, the solubility and gas transfer process is enhanced due to the increased pressure in depth. Such action results in increased gas transfer into solutions and biological systems.

Similarly, as the saturated and super-saturated solutions reach the surface and ambient atmospheric pressure is existent, the gas comes out a solution and will act to strip volatile constituents from the water into gas bubbles. The fine bubbles formed as the pressurized solution moves toward atmospheric pressure acts as dissolved air floatation units by separating non-soluble materials such as petroleum distillates, synthetic oils and greases, naturally-occurring oils and greases, and floating such materials upwardly in the form of emulsions or separated layers moved upwardly from the bottom of the installation.

Accordingly, the improved process for 'in situ' treating of contaminated soil environments is simplified and provides an effective, safe, inexpensive and efficient procedure to render contaminated water emitting from waste sites and rubbish dumps to be effectively treated in an expedient manner to achieve all of the enumerated objectives, provides for eliminating difficulties encountered with prior procedures, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention in its various embodiments are by way of example, and the scope of the invention is not limited to the exact details shown or described.

Having now described the features, discoveries and principles of the invention, the manner in which the improved soil treatment process is used and the advantageous new and useful results obtained are set forth in the appended claims.

I claim:

1. The method of 'in situ' collection and treatment of floating, sinking and dissolved contaminants existent up to considerable depths in a soil environment comprising the steps of forming an in-ground diversionary water barrier as a boom around at least the downstream area of said soil environment and to a depth at least as great as the presence of contaminants affecting in-ground water flow, and providing collection and treatment means at a substantial depth to create an in-ground containment reservoir to collect said contaminants within said in-ground reservoir primarily for 'in situ' treatment of said contaminants into non-contaminating condition.

2. The method in accordance with claim 1, including the step of providing collection and treatment means in the form of one or more tubular members extending generally vertically from the surface of said contaminated soil environment into said in-ground containment reservoir.

3. The method in accordance with claim 2, including the step of positioning the said collection and treatment means upstream with respect to said water barrier and in vertical array in proximity to said contaminated soil environment.

4. The method in accordance with claim 1, including the step of forming said in-ground diversionary water barrier as a boom in vertical or inclined relation to maintain and direct both in-ground and surface water flow to facilitate collection of said contaminants in said containment reservoir by said water flow primarily for their 'in situ' treatment and secondarily for their removal above ground.

5. The method in accordance with claim 1, including the step of directing the major portion of said contaminants by in-ground water flow toward said in-ground diversionary barrier and into said containment reservoir for collection and/or treatment of said contaminants.

6. The method in accordance with claim 1, including the step of forming said collection and treatment means by a series of vertically disposed tubular members extending from the surface of said contaminated soil environment into said in-ground containment reservoir.

7. The method in accordance with claim 1, including the step of employing the said in-ground diversionary water barrier to direct in-ground water flow into one or more collection sumps constituting said in-ground containment reservoir for treatment of said contaminants.

8. The method in accordance with claim 1, including the step of surrounding the major portion of said contaminated soil environment by said in-ground diversionary water barrier serving as a boom to retain and collect by water washing and leaching the said contaminants in said containment reservoir for their 'in situ' treatment into non-toxic condition.

9. The method in accordance with claim 1, including the step of introducing a series of tubular members in vertical array into said contaminated soil environment upstream of in-ground water flow to constitute said collection and treatment means and to form said containment reservoir.

10. The method in accordance with claim 1, including the step of employing a plurality of vertical collection pipes as said collection and treatment means disposed upstream and adjacent to said water barrier to collect and retain the said contaminants for their treatment and/or removal for treatment.

11. The method in accordance with claim 1, including the step of promoting biological growth within said contaminated soil environment by said collection and treatment means to render said contaminants non-toxic and environmentally safe.

12. The method in accordance with claim 1, including the step of controlling the water level in said containment reservoir for extraction of said contaminants from in-ground water flow for their collection and 'in situ' treatment.

13. The method in accordance with claim 1, including the step of forming an 'in situ' below-ground enclosure employing said diversionary water barrier as a boom around the perimeter of a leaky tank to contain the contaminated soil environment therebeneath for 'in situ' treating of said contaminants to render the same non-toxic and environmentally safe.

14. The method in accordance with claim 1, including the step of promoting saturated moisture conditions within said containment reservoir to create anaerobic conditions for the conversion of organic chemical contaminants by anaerobic degradation into environmentally safe and non-toxic condition.

15. The method in accordance with claim 1, including the step of placing the said in-ground diversionary water barrier upstream and vertically with respect to said collection and treatment means to divert and control in-ground water flow into said containment reservoir.

16. The method of 'in situ' collecting and treating of floating, sinking and dissolved contaminants existent up to considerably depths in a soil environment comprising the steps of forming an in-ground vertical water barrier as a boom to control and maintain the flow of in-ground water, said barrier being positioned around the downstream area of said contaminated soil environment to a depth at least as great as the presence of contaminants affecting in-ground water flow, introducing a plurality of vertical tubular members into the contaminated soil environment upstream and adjacent to said water barrier to form one or more in-ground containment reservoirs for said contaminants, and employing the said vertical tubular members to collect and treat said contaminants in place without displacement of the soil environment.

17. The method in accordance with claim 16, including the step of promoting biological growth of the water-contaminant material within said containment reservoir to convert the said contaminants to environmentally safe non-toxic condition.

18. The method in accordance with claim 17, including the step of introducing reactants through said plurality of vertical tubular members to promote anaerobic reactions with said contaminants within a plurality of containment reservoirs.

* * * * *

UNITED STATES PATENT AND TRADEMARK OFFICE
CERTIFICATE OF CORRECTION

PATENT NO.   : 5,054,961
DATED        : October 8, 1991
INVENTOR(S)  : Lynn D. Sherman It is certified that error appears in the above-identified patent and that said Letters Patent is hereby corrected as shown below:

<u>Title page,</u>
Item [73], the correct name of the Assignee is -- Ocean Toad Enterprises Inc. --

Signed and Sealed this

Twentieth Day of May, 2003

JAMES E. ROGAN
*Director of the United States Patent and Trademark Office*